(12) United States Patent
Pare, Jr. et al.

(10) Patent No.: US 7,995,665 B2
(45) Date of Patent: *Aug. 9, 2011

(54) METHOD AND APPARATUS FOR RECEPTION IN A MULTI-INPUT-MULTI-OUTPUT (MIMO) ORTHOGONAL FREQUENCY DOMAIN MODULATION (OFDM) WIRELESS COMMUNICATION SYSTEM

(75) Inventors: Thomas E. Pare, Jr., Mountain View, CA (US); Shuling Feng, San Jose, CA (US)

(73) Assignee: Ralink Technology (Singapore) Corporation Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,000

(22) Filed: Mar. 31, 2010

(65) Prior Publication Data

US 2010/0189167 A1 Jul. 29, 2010

Related U.S. Application Data

(63) Continuation-in-part of application No. 12/632,707, filed on Dec. 7, 2009, which is a continuation-in-part of application No. 11/475,606, filed on Jun. 26, 2006, now Pat. No. 7,856,068.

(51) Int. Cl.
*H04K 1/10* (2006.01)

(52) U.S. Cl. ........ 375/260; 375/267; 375/299; 375/316; 375/340; 375/346; 375/347; 375/348; 455/101; 455/132; 455/296; 455/500; 455/562.1; 370/210; 370/335; 370/342; 370/480

(58) Field of Classification Search .................. 375/260, 375/267, 299, 316, 340, 346, 347, 348; 455/101, 455/132, 296, 500, 562.1; 370/210, 335, 370/342, 480
See application file for complete search history.

(56) References Cited

U.S. PATENT DOCUMENTS

| | | |
|---|---|---|
| 7,019,595 B1 | 3/2006 | Lo et al. |
| 7,039,004 B2 | 5/2006 | Sun et al. |
| 7,068,628 B2 | 6/2006 | Li et al. |
| 7,197,094 B2 | 3/2007 | Tung |
| 7,233,773 B2 | 6/2007 | Hansen et al. |
| 7,245,677 B1 | 7/2007 | Pare, Jr. |
| 7,248,650 B1 | 7/2007 | Tung et al. |
| 7,266,146 B2 | 9/2007 | Pare, Jr. et al. |
| 7,324,608 B1 | 1/2008 | Chiodini et al. |
| 7,369,626 B1 | 5/2008 | Chiodini et al. |
| 7,423,989 B2 | 9/2008 | Hansen et al. |
| 7,444,134 B2 | 10/2008 | Hansen et al. |
| 7,558,537 B2 * | 7/2009 | Trachewsky et al. ......... 455/104 |
| 2005/0058193 A1 | 3/2005 | Saed |
| 2005/0152314 A1 | 7/2005 | Sun et al. |
| 2005/0276347 A1 | 12/2005 | Mujtaba et al. |

(Continued)

OTHER PUBLICATIONS

Jianhua Liu et al. "A MIMO System with Backward Compatibility for OFDM Based Alans" IEEE 2003 (Abstract only).

*Primary Examiner* — Leon Flores
(74) *Attorney, Agent, or Firm* — Sawyer Law Group, P.C.

(57) ABSTRACT

An embodiment of the present invention includes a transceiver for use in a multi-input-multi-output (MIMO) Orthogonal Frequency Domain Multiplexing (OFDM) wireless communication system. The transceiver decodes and remodulates certain signal fields and uses the same to update the coefficients of a frequency equalizer thereby improving channel estimation and extending training.

21 Claims, 8 Drawing Sheets

U.S. PATENT DOCUMENTS

| | | |
|---|---|---|
| 2006/0092892 A1 | 5/2006 | Trachewsky |
| 2006/0182017 A1 | 8/2006 | Hansen et al. |
| 2006/0239375 A1 | 10/2006 | Kim et al. |
| 2006/0274852 A1 | 12/2006 | Trachewsky et al. |
| 2009/0103666 A1* | 4/2009 | Zhao et al. .................... 375/341 |
| 2010/0086013 A1* | 4/2010 | Pare et al. ..................... 375/219 |
| 2010/0189167 A1 | 7/2010 | Pare, Jr. et al. |

* cited by examiner

METHOD AND APPARATUS FOR RECEPTION IN A MULTI-INPUT-MULTI-OUTPUT (MIMO) ORTHOGONAL FREQUENCY DOMAIN MODULATION (OFDM) WIRELESS COMMUNICATION SYSTEM

CROSS-REFERENCE TO RELATED APPLICATION

This application is a continuation-in-part of U.S. patent application Ser. No. 12/632,707, entitled "METHOD AND APPARATUS FOR RECEPTION IN A MULTI-INPUT-MULTI-OUTPUT (MIMO) ORTHOGONAL FREQUENCY DOMAIN MODULATION (OFDM) WIRELESS COMMUNICATION SYSTEM", filed on Dec. 7, 2009, which is a continuation-in-part of U.S. patent application Ser. No. 11/475,606 now U.S. Pat. No. 7,856,068, entitled "NESTED PREAMBLE FOR MULTI INPUT MULTI OUTPUT ORTHOGONAL FREQUENCY DIVISION MULTIPLEXING", filed on Jun. 26, 2006, all of which are incorporated herein by reference.

This application is related to U.S. Pat. No. 7,324,608, entitled "EFFICIENT SUBCARRIER WEIGHTING TO ENHANCE RECEIVER PERFORMANCE", issued on Jan. 29, 2008, and U.S. Pat. No. 7,369,626, entitled "EFFICIENT SUBCARRIER EQUALIZATION TO ENHANCE RECEIVER PERFORMANCE", issued on May 6, 2008, all of which are incorporated hereby by reference.

FIELD OF THE INVENTION

The present invention relates generally to the field of wireless communication systems and particularly to a method and apparatus for enhancing channel estimation and subsequent equalization in a receiver used in multi-input-multi-output (MIMO) Orthogonal Frequency Domain Multiplexing Systems (OFDM) wireless communication systems.

BACKGROUND OF THE INVENTION

Communication systems utilize either wire or wireless transmission according to adopted standards. Implementations can range from local wireless networks in the home, to the national and international cell phone networks, to the worldwide Internet.

Communication systems typically conform to one or more of a number of existing standards. Wireless standards include the Institute of Electrical and Electronics Engineers (IEEE) 802.11 wireless local area network (WLAN), the advanced mobile phone services (AMPS), Bluetooth, global system for mobile communications (GSM), code division multiple access (CDMA), local multi-point distribution system (LMDS), multi-channel-multi-point distribution systems (MMDS), and various proprietary implementations of such standards.

Wireless devices in a network, such as a laptop computer, personal digital assistant, video projector, or WLAN phone, can communicate either directly or indirectly to other users or devices on the network. In direct communication systems, often referred to as point-to-point communication systems, the two devices are assigned one or more communication radio frequency (RF) channels, and the devices communicate directly over those channels. In indirect communication systems, the devices communicate through an intermediary device, such as an associated base station for cellular services, or an access point for home or office WLAN networking, on an assigned channel. To complete the connection, the access point or base station communicates with the pair directly, using the system controller, the Public switch telephone network (PSTN), the Internet, or some other wide area network.

It is well known that better channel estimation and equalization can enhance wireless link performance, either through extending the link range, or increasing data throughput rates. In noisy channel conditions, performance often suffers because of inaccurate channel estimation, or channel training. A further problem often encountered is instability in the analog radio frequency (RF) circuitry, which is often most pronounced early in the packet, during the channel training portion of the preamble. This introduces an error in the channel estimation that can lead to packet loss, and degraded link stability. These problems are prevalent in multi-input-multi-output (MIMO) orthogonal frequency domain modulation (OFDM) communication systems. This is of particular interest in wireless communications systems conforming to the 802.11(n) standard adopted by IEEE because two modes of operation are employed, one being mixed mode and another being Greenfield.

Methods to improve OFDM channel estimation involve smoothing in the frequency domain (Perahia 2008), or by using a time-domain formulation (Edfors, et al 2004). The improvement through frequency domain smoothing is limited; particularly in multipath conditions in which case smoothing can actually degrade performance. The time domain minimum mean-squared error (MMSE) formulation methods are not desirable because they require additional fast fourier transform (FFT)/inverse fast fourier transform (IFFT) modules, which are complex and costly to implement.

Another known method to improve channel estimation/equalization is to implement an adaptive channel estimation/training algorithm that updates the estimate during the data portion of the packet. Adaptive methods can be complex, and typically take time to converge, during which time an error can occur.

One simple method to solve the 802.11(n) OFDM channel estimation problem is to use the standard designated training fields in order to perform the channel estimation/equalization function. However, this can be sub-optimal, particularly when RF transients corrupt the preamble portion of the packet, or in noisy channel conditions, as much as 2 dB receiver sensitivity can be lost. Alternately, a frequency domain smoother can be used to smooth out noise in the channel estimate by taking advantage of assumed correlation between adjacent subcarriers. However, the smoother can actually degrade performance when this correlation assumption is invalid. Time domain methods are another way to enhance channel estimation accuracy, but require expensive FFT modules for each additional receiver chain. Lastly, adaptive estimation/equalization methods (LMS) can be used to slowly adapt the estimate during the data portion of the packet. However, for short packets, the estimate may not converge fast enough to provide any performance benefit.

Thus, there exists a need to provide a method and apparatus for improving channel estimation and subsequent equalization for receivers of multi-input-multi-output (MIMO) orthogonal frequency domain modulation (OFDM) communication systems that includes a header during transmission of information used to decode and enhance the accuracy of the channel training.

SUMMARY OF THE INVENTION

Briefly, an embodiment of the present invention includes a transceiver for use in a multi-input-multi-output (MIMO)

Orthogonal Frequency Domain Multiplexing (OFDM) wireless communication system. The transceiver transmits and receives information including signal fields. The transceiver includes a first decoder block responsive to a first signal field of a preamble of a packet transmitted in a communication channel, the first signal field having been modulated prior to being received by the first decoder. The first decoder block decodes the first signal field and generates a first decoded preamble field. The transceiver further includes a second decoder block of a MIMO OFDM wireless communication system responsive to a second signal field of a preamble of a packet transmitted in a communication channel, the second signal field having been modulated prior to being received by the second decoder. The second decoder block makes a determination as to whether the packet is a single stream packet. The second decoder block decodes the second signal field and generates a second decoded preamble field. The transceiver further includes a first remodulator of a MIMO OFDM wireless communication system responsive to the decoded preamble field and operative to generate first remodulated encoded preamble field and a frequency domain equalizer update block operative to update coefficients of a frequency domain equalizer (FEQ) using the first remodulated encoded preamble bits. The FEQ update block causes the FEQ to generate equalized preamble field output, which is applied to at least one data field.

The foregoing and other objects, features and advantages of the present invention will be apparent from the following detailed description of the preferred embodiments which make reference to several figures of the drawing.

DETAILED DESCRIPTION

Figure 1:
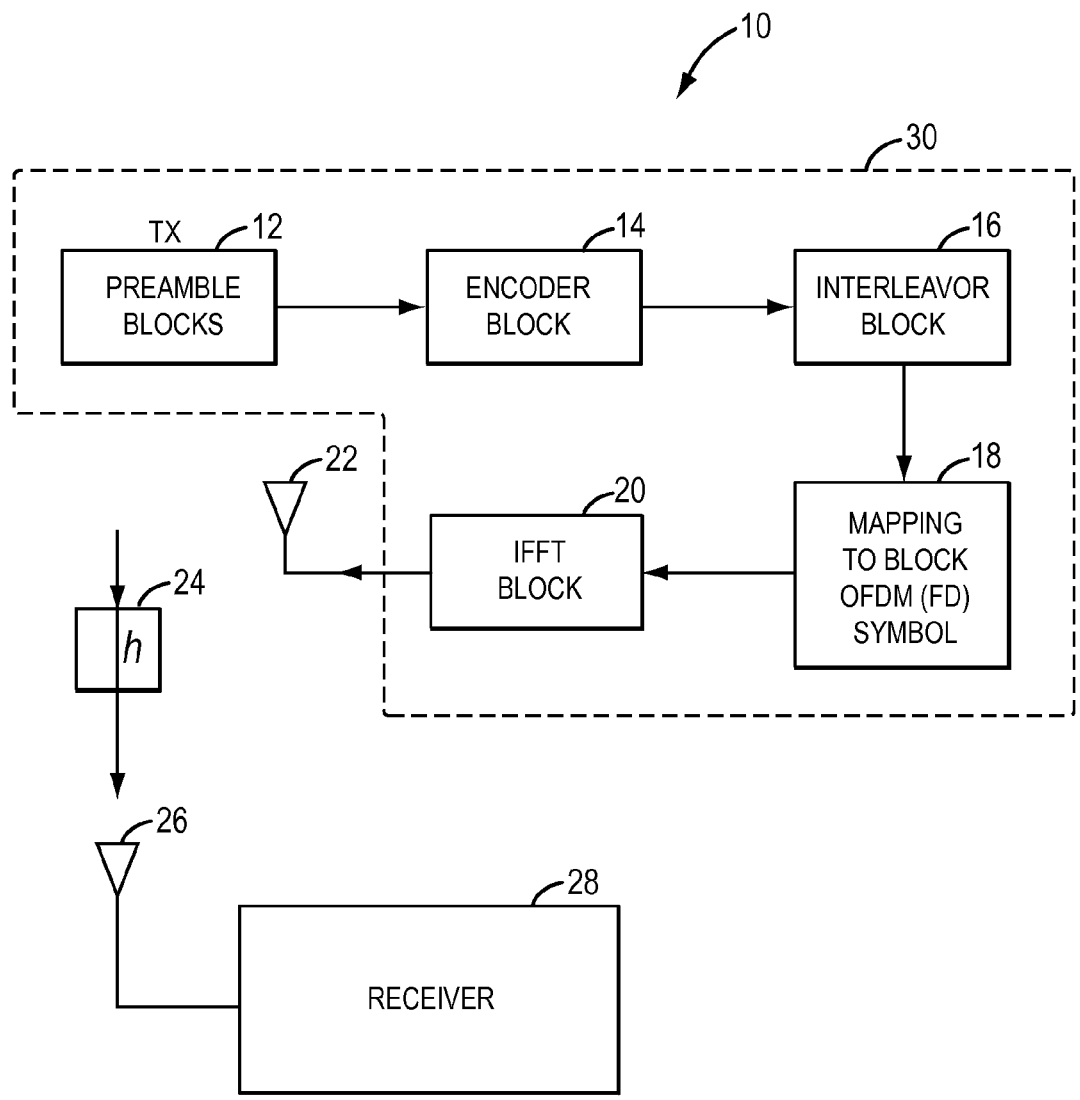
FIG. 1 shows a multi input multi output (MIMO) transceiver 10, in accordance with an embodiment of the present invention.

Referring now to FIG. 1, a multi input multi output (MIMO) transceiver 10 is shown to include a MIMO transmitter 30, an antenna 22, an antenna 26, and a receiver 28, in accordance with an embodiment of the present invention. The transmitter sends preamble and data information, through the antenna 22, to the receiver 28, which receives this information through the antenna 26. A channel model 24, indicated by "h", represents the wireless channel between the transmitter 10 and its antenna 22, and the receiver 28 and its respective antenna 26. Further details of receiver 28 are presented and discussed relative to subsequent figures.

Transceiver 10 is shown to include a preamble block 12, an encoder block 14, a block interleaver block 16, a mapping block 18 and an inverse fast Fourier transform (IFFT) block 20. Preamble block 12 generates preamble bits that are used for equalizer training and synchronization and other types of function related to the data that is to be transmitted following the preamble. Included in such information (in bits) is information that leads the receiver to detect which mode the transceiver 10 is using, i.e. mixed mode or Greenfield, and which type of modulation is used for the data portion of the packet.

Encoder block 14 is shown to receive the preamble bits generated by preamble block 12 and encodes the same according to known encoding techniques, an example of which is Viterbi encoding. It is noted that information transmitted by the transmitter 30 is in the form of packets and the preamble bits are typically organized into fields. Examples of fields are provided shortly.

Interleaver block 16 is shown to receive encoded preamble bits from encoder block 14 and to interleave the same to generate interleaved preamble bits. The interleaver block 16 utilizes known interleaving techniques, one such known technique is disclosed in the IEEE 802.11(a)-1999 Standard.

Mapping block 18 receives the interleaved preamble bits from interleaver block 16 and maps the same to orthogonal frequency domain modulation (OFDM) symbols and provides the same to IFFT block 20, which performs an inverse FFT to convert the OFDM symbols to time domain prior to transmission thereof through antenna 22. As previously noted, channel model 24 models the channel including the time domain symbols.

Receiver 28 advantageously employs transmitter 30 to remodulate the at least some of the preamble fields and apply the same to update the coefficients of its frequency equalizer thereby improving channel estimation and channel training. More specifically, receiver 28 advantageously uses the given structure of the OFDM preamble, commonly known as "signal fields", and re-modulates them using transmitter 30, which is an existing and known transmitter, to provide an extended training reference. The advantage is that no additional circuitry is required, unlike prior art techniques. Also, it does not require any assumptions about correlation in the frequency domain between subcarrier, so performance improvement with no loss is always guaranteed. Further, the estimate, for example, the channel estimate "h", is improved in one-shot, at the beginning of the packet, and no convergence wait time is needed, like the prior art adaptive approach.

It is understood that the figures and discussion presented herein are related to a single stream application of transceiver 10 where only one stream is communicated between transmitter 30 and receiver 28. A single stream can be comprised of 52 subcarriers four of which are pilots (processed by the pilot processor of FIG. 5 in one embodiment of the present invention) and the remaining 48 are data for 802.11(a) packets, or 56 subcarriers for 802.11(n) packets, 52 of which are data subcarriers and 4 reserved for pilots.

Figure 2:
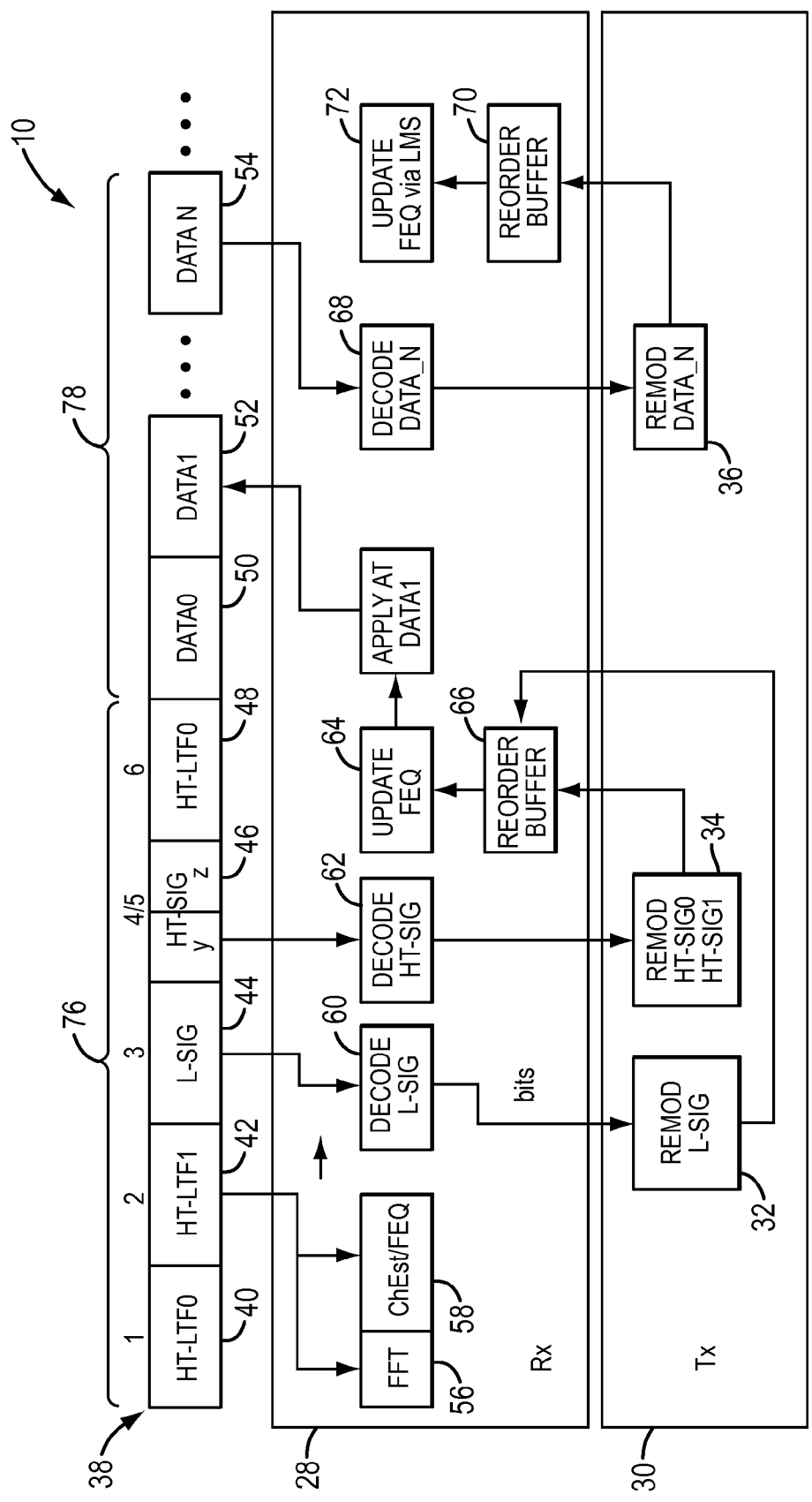
FIG. 2 shows further details of transceiver 10 when used in a mixed mode to send and receive information in accordance with the 802.11(n) standard.

FIG. 2 shows further details of transceiver 10 when used in a mixed mode to send and receive information in accordance with the 802.11(n) standard.

Transmitter 30 is shown to perform L-SIG remodulator block 32, HT-SIG0 and HT-SIG1 remodulator block 34 and data remodulator block 36, in accordance with an embodiment of the present invention. Each of the remodulator blocks 32, 34 and 36 includes the blocks shown in the transmitter 30 of FIG. 1. Alternatively, one or more remodulator may be employed to carry out the remodulation functions of the individual remodulator blocks 32, 34 and 36. L-SIG, HT-SIG0 and HT-SIG1 are examples of signal fields. "Remodulator" refers to the functions and structures used to perform at least encoding, interleaving, mapping.

Receiver 28 is shown to include an FFT block 56, a channel estimation/FEQ block 58, a L-SIG decoder block 60, a HT-SIG decoder block 62, an update FEQ block 64, a reorder buffer 66, a data decoder block 68, an data update FEQ block 72 and a data reorder buffer 70.

Channel estimation/FEQ block 58 performs channel estimation and FEQ in the frequency domain, thus, prior to being processed by the block 58, preamble fields are transformed into the frequency domain, from the time domain, to ultimately, prior to being applied to one or more data fields, they are transformed from the frequency domain to the time domain by virtue of an IFFT.

Transmitter 30 sends preamble and data information to receiver 28, as previously noted. In FIG. 2, information 38, including preamble and data bits, is transmitted by transmitter 30 to receiver 28. In this respect, information 38 is a portion of a mixed mode packet. However, receiver 28 cleverly decodes and re-sends certain preamble information back to transmitter 30 for remodulation thereof and use for application to a certain data field(s) thereby extending the training reference and improving channel estimation. Receiver 28, upon decoding of an HT-SIG field of information 38 knows that the information it is receiving is for mixed mode. For further details relating to the two modes, mixed and Greenfield, the reader is referred to in the IEEE P802.11(n)™/D10.00 Draft STANDARD for Information Technology-Telecommunications and information exchange between systems-Local and metropolitan area networks-Specific requirements-Part 11: Wireless LAN Medium Access Control (MAC) and Physical Layer (PHY) Specifications: Amendment 4: Enhancements for Higher Throughput.

Information 38 is shown to include preamble fields 76 and data fields 78. In the mixed mode of 802.11(n), preamble fields 76 include the following fields, which are sent consecutively in the following order: High Throughout (HT)-long training field (HT-LTF0) 40, HT-LTF1 42, legacy (L)-SIG 44, HT-SIG 46, and HT-LTF0 48. Data fields 78 comprise the following data fields in consecutive order as follows: DATA0 50, DATA1 52 through DATA_N 54.

FFT 56 receives the fields 76 and transforms each field thereof from the time domain to frequency domain and generates a frequency-domain preamble for use by the block 58. The block 58 estimates the channel or calculates an inverse of "h" (the channel model), in frequency domain, and performs frequency equalization on the frequency-domain preamble for use by the block 60. The block 60 also receive the L-SIG field 44 ("L" representing "long") and generates decoded preamble bits for use by transmitter 30, which remodulates the same—L-SIG remodulation is performed. Similarly, block 62 decodes HT-SIG ("HT" representing High Throughput) and generates the decoded preamble to transmitter 30—HT-SIG remodulation is performed by transmitter 30. Transmitter 30 generates remodulated L-SIG and remodulated HT-SIG for use by reorder buffer 66 of receiver 28. Thus, the remodulated L-SIG and HT-SIG symbols are advantageously used as references to update, or improve the initial channel estimate and FEQ.

Figure 5:
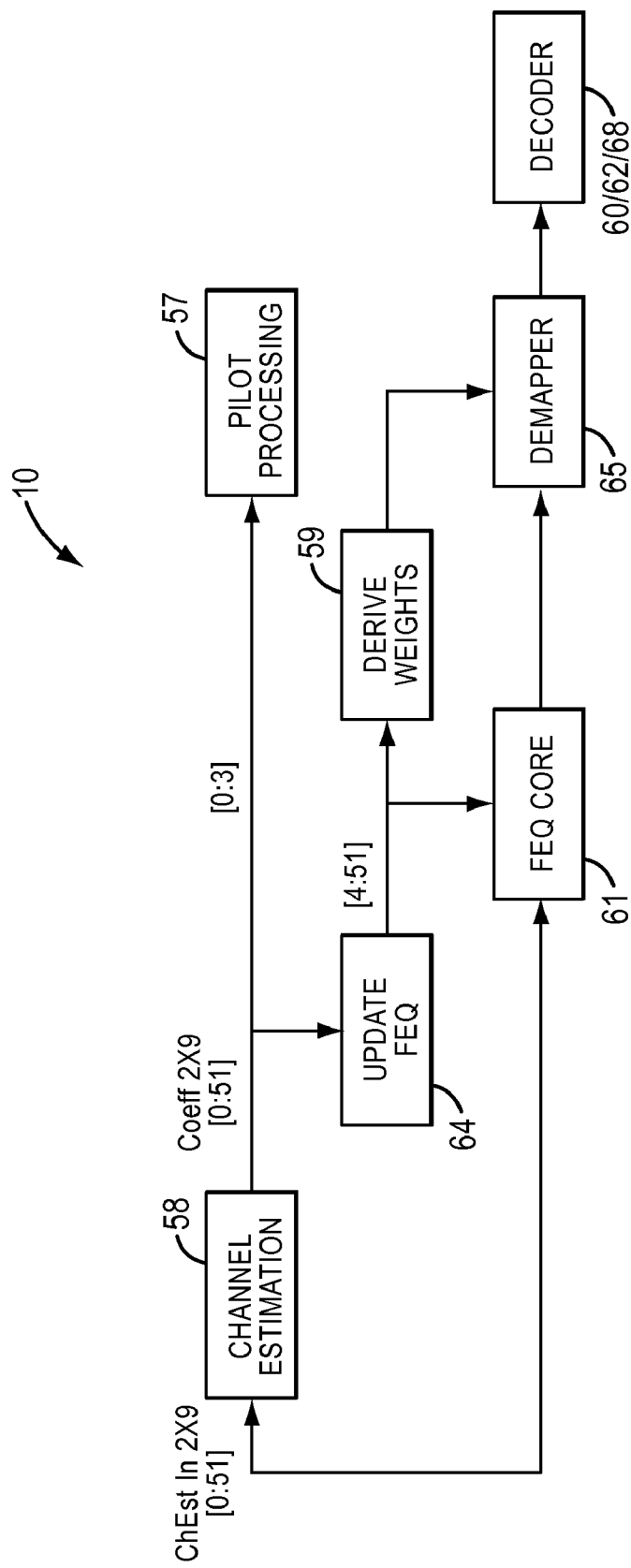
FIG. 5 shows an alternate embodiment of the present invention where the FEQ, the decoder or demapper are updated.

Reorder buffer 66 reorders the symbols to reverse the affect of the symbols having been ordered out of position by the IFFT process performed by transmitter 30. Reorder buffer 66 generates reordered remodulated preamble to block 64, which uses the same to update the FEQ and to apply the result to DATA1 field 52. While the result of the FEQ can be applied to DATA0 field 50, this is less than desirable because of the delay in re-processing the L-SIG field. Further adaptation can further improve performance, particularly if the channel parameters are changing during the coarse of the packet, in which case, this structure can provide an additional "channel tracking" functionality. It is noted that the foregoing signal fields (preamble fields) are decoded in time to apply the same to data thereby improving channel estimation and equalization and decoder weights. Decoder, or demapper weights, for determining Viterbi bit metrics, are sometimes referred to as LLR: log-likelihood ratio. Essentially, when the confidence in a particular subcarrier is small, the corresponding output weights should be small as well, so that the output from this subcarrier can be adequately "de-weighted" prior to the decoding process. These weights are shown in FIG. 5.

Remodulated L-SIG and HT-SIG preambles are optionally used to update the block 64 and be applied to DATA2 field 52 through DATA_N fields 54.

In one embodiment of the present invention, the least-means-square (LMS) algorithm, well known to those skilled in the art, is used to update the coefficients of the FEQ of the block 64. In other embodiments, other known techniques, such as but not limited to Recursive Least-squares (RLS), may be employed.

It is noted that HT-SIG field 46 includes HT-SIG0 and HT-SIG1 and both are provided to the block 62.

In some embodiments, in addition to remodulating the preamble symbols, data symbols are also remodulated and used to update the coefficients of the FEQ that equalizes data. For example, in FIG. 2, data fields, such as DATA_N field 54 is shown provided to the block 68 for decoding thereof. Again, an example of the decoding performed by block 68 is Viterbi decoding although decoding is not limited to this type and can be any suitable type of decoding. The decoded data is then provided by block 68 to transmitter 30 for remodulation thereof—remodulation 36 is performed on the data symbols. The remodulated data is then provided by transmitter 30 to reorder buffer 70, which reorder the data to reverse the disorganizing affects of the transmitter's IFFT and provides the reordered data symbols to block 72, which updates the coefficients of the FEQ and equalizes using the remodulated data field (symbol). This additionally improves channel estimation.

It is noted that the HT-LTF0 field 40, HT-LTF1 field 42, L-SIG field 44 and HT-SIG field 46 and transmitted as 48 non-pilot (signal) subcarriers and 4 pilot subcarriers and HT-LTF0 field 48 and field 78 are transmitted as 52 non-pilot subcarriers and 4 pilot subcarriers.

The initial channel estimate 58 (which are used to compute coefficients of the FEQ) for each of the 52 (including 48 data subcarriers and 4 pilot tones) subcarriers, as defined by the 802.11(g) standard, are calculated in accordance with the following equation:

$$coef11g_k = \frac{\sum_{n=1}^{2}(L-LTF_n)}{2} \quad \text{EQ. (1)}$$

where k is the subcarrier index, and the summation is over the two L-LTF fields. For each kth subcarrier, the entries in the summation are the output of the FFT, phase corrected by the training symbol ltf(k) sent on the particular subcarrier:

$$L\text{-}LTF_n(k) = \mathit{fft\_out}_n(k) \times ltf(k) \quad \text{EQ. (2)}$$

The phase correction is simply a pre-stored BPSK symbol, with a value of +1 or −1 depending on the subcarrier number.

The foregoing channel estimation describes a typical prior art receiver channel estimation 58, employing only the L-LTF portion of the preamble. The prior art FEQ, for each subcarrier, would simply be the inverse of the coefficient.

The present invention improves on the prior art receiver by utilizing all additional signal information in the preamble to update the channel coefficients, and the elements of the FEQ. In one embodiment of the invention, 802.11(n) implementation, in mixed mode in consideration. Using all signal fields, shown in FIG. 2, the 52 channel coefficients are calculated in accordance with the following equation:

$$coef11g_k = \frac{HT\text{-}LTF_0 + L\text{-}SIG + \sum_{n=1}^{2}(L\text{-}LTF_n + HT\text{-}SIG_n)}{6} \quad \text{EQ. (3)}$$

where as above L-LTFn are the phase corrected outputs of FFT module 56 'Σ' represents a summation operation over 2 fields, and the additional elements HT-SIGn, L-SIG, and HT-LTF0 represent the HT signal field (two total), the legacy signal field, and the HT long training field, respectively. As for the prior art case, these elements are the FFT outputs of these symbols, and are phase corrected. In order to the properly phase the L-SIG, HT-SIG FFT outputs, the same symbols need to be equalized (FEQ 80), decoded (86), and remodulated (32). The output of the remodulation block 32 provides BPSK phase for each subcarrier, so that the L-SIG and HT-SIG fields may be phase corrected and used to improve the channel estimate. This is a practical solution for many packet based communication systems containing a preamble/header structure because the SIG fields in the header are often modulated at the lowest modulation rate, making the decoding/remodulation stages fast and accurate.

The mixed-mode 11n packets are defined with the legacy portion consisting of 52 total subcarriers. At the start of the HT-STF field (see modified FIG. 2), the signal includes 4 additional subcarriers at the band edge to increase overall throughput. The additional 4 802.11(n) subcarriers are updated according to the equation:

$$coef11n_k = HT\text{-}LTF_0 \quad \text{EQ. (4)}$$

Figure 3:
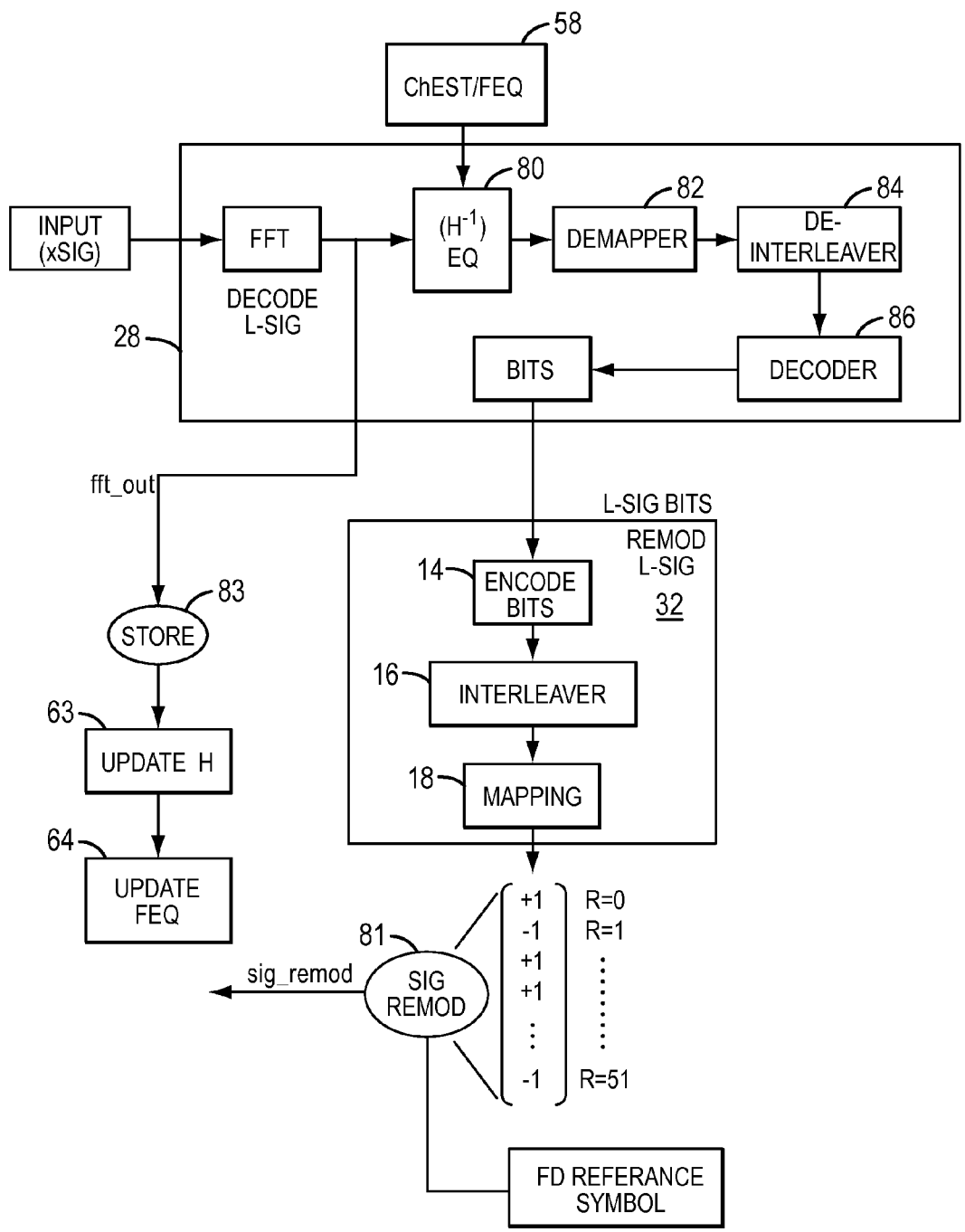
FIG. 3 shows further details of the receiver 28 as well as representing some of the functions performed by the receiver 28.

This means that the 4 additional subcarriers (two on each band edge) will have less refinement than the 802.11(g) set of 52. Also, Eq. (2) represents the prior art 802.11(n) design, in which only the phase corrected HT-LTF symbols are used to train all the subcarriers FIG. 3 shows further details of the receiver 28, and the functions performed by the receiver 28 for the refinement of the channel estimation coefficients and FEQ, as described above. In FIG. 3 the block 28 performs the typical process of decoding the input signal fields xSIG (x indicating either legacy (L) or HT), shown as inputs to the FEQ 56. The typical receiver block 28 is further shown to include the FEQ block 80, a demapper block 82, a de-interleaver block 84, and a decoder block 86, in accordance with an embodiment of the present invention. The block 58, which computes the initial channel estimation and equalizer, is shown to be coupled to the block 80, which is shown to receive input in the form of frequency domain (FD) preamble, such as the L-SIG field, and subsequent data symbols 50 and 52. The block 56 performs a fast Fourier transform function on the received input and generates a frequency-domain output to the FEQ block 80, which equalizes the frequency-domain symbols and generates an equalized symbol to the demapper block 82. The demapper block 82 reverses the affects of the block 18 done by the transmitter 30 and essentially converts OFDM symbols to bits for use by the de-interleaver block 84. The de-interleaver block 84 reverses the affects of the block 16 by the transmitter 30 and provides de-interleaved preamble to the decoder block 86, which decodes the de-interleaved symbols and generates decoded bits (of either the signal or data fields) for use by the transmitter 30 in order to improve receiver performance. In one embodiment (the reception of MM packet), the preamble includes the L-SIG field, thus, L-SIG preamble bits are provided to the block 14 of the transmitter 30 and are, as discussed with reference to FIG. 1, encoded and interleaved and mapped into OFDM symbols with the result being provided to the receiver 28. The affect of the foregoing functions performed by the transmitter 30 is remodulation of the L-SIG field. The remodulated signal field 81 is shown as sig_remo in FIG. 3. The remodulated signal field 81 is combined with the corresponding stored feq_out 83, from the FFT, to be used by block 63 to update the coefficients of the channel estimation. In this case, the channel update uses these foregoing signals to form the signal to be used in Eq. (3)

$$L\text{-}SIG(k) = \mathit{fft\_out} \times lsig\_remo \quad \text{EQ. (5)}$$

This process of storing, decoding, and remodulation of the mixed mode preamble is then used for the HT-SIG field to form the HT-SIG element of Eq (3):

$$HT\text{-}SIG_n(k) = \mathit{fft\_out} \times htsig\_remo \quad \text{EQ. (6)}$$

To complete the computation of the channel estimate, HT-LTF training field is used. Because this field is a pre-stored training field and not encoded, no remodulation is required to include it into the channel estimation 63. Note that a prior art receiver would only use the HT-LTF field to estimate the channel.

In effect, the channel estimation of Eq. (3) above is implemented by block 63 using the remodulated preamble 81 combined with the legacy and HT training fields: L-LTF and HT-LTF. The storage 83, is used essentially to store the FFT output until the process of remodulating the signal field symbols can be remodulated. The remodulated symbols are used to remove the phase of the coded preambles. Finally, using the extended channel estimate, the channel equalizer FEQ can be computed 64.

In FIG. 2, the output of the block 58 is referred to as the frequency domain (FD) symbol and the remodulation preamble is referred to as the FD reference symbol in FIG. 2.

Figure 7:
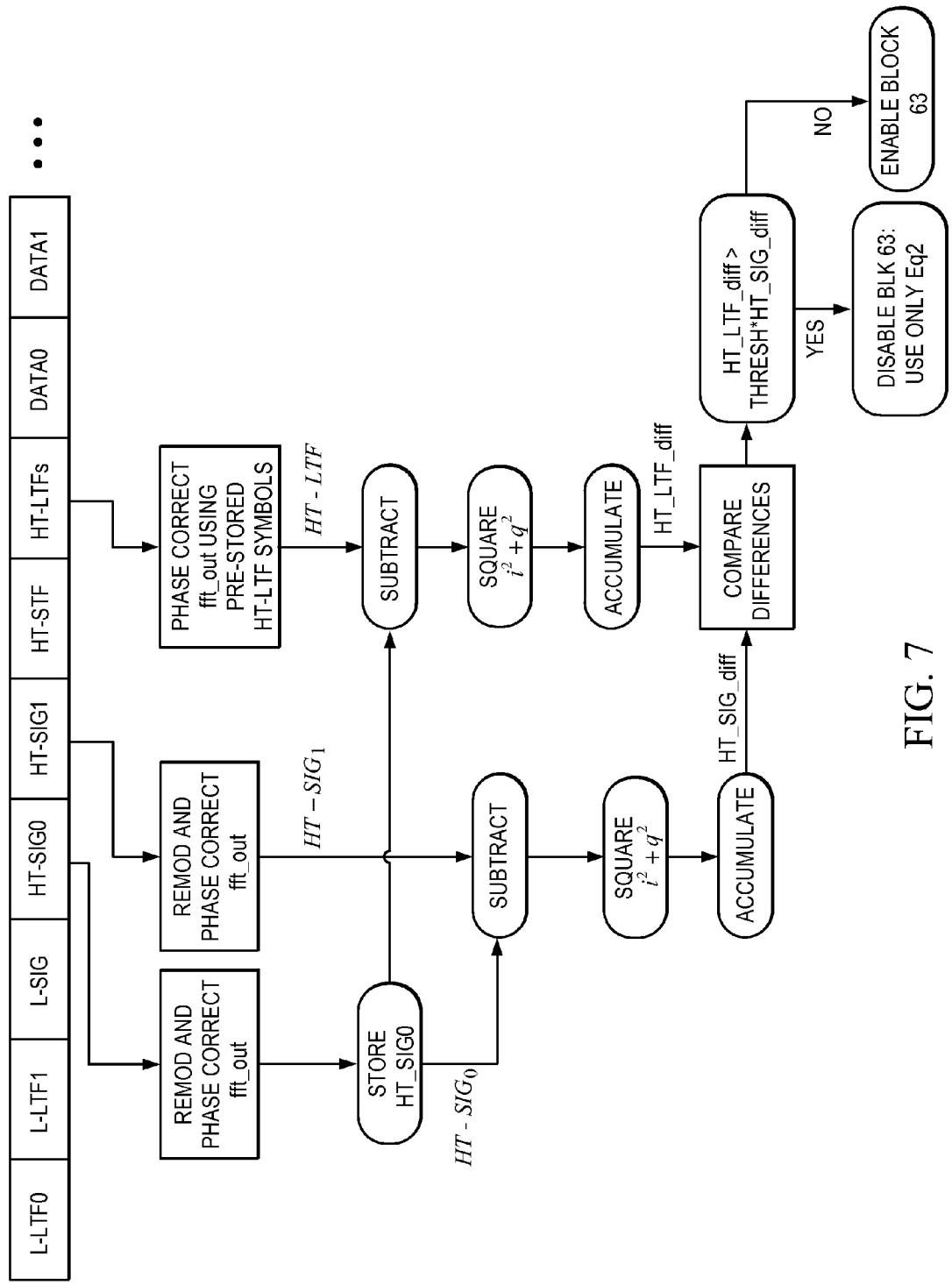
FIG. 7 shows a scheme for detecting a large difference between the phase corrected FFT output from the FFT, between the HT-SIG and HT-LFF fields of the packet being received by the transceiver 10, in accordance with another embodiment of the present invention.

In some embodiments, remodulation of the signal fields and/or the data fields may be selectively turned 'on' and 'off' by automatically detecting a large difference between the phase corrected FFT outputs from the FFT, between the HT-SIG and HT-LTF portions of the packet. Large differences may occur due to effects such as beamforming, or changes in the cyclic shift delays (as specified in the 802.11(n) standard) that can occur at the start of the HT-STF. One such scheme is depicted in FIG. 7. In the FIG. 7, the FFT outputs of HT-SIG0 and HT-SIG Fields 0 and 1 are phase adjusted using the remodulated corresponding signal fields, and then subtracted, as shown in FIG. 7. This difference, or error, between the two vectors is formed for each subcarrier, squared, and summed up in the accumulator. This single real number, HT_SIG_diff is stored and used to compare against the same error calculation made by subtracting HT-SIG0 and HT-LTF0, HT_LTF_diff. Any effect such as beamforming or CSD changes will cause the HT_ LTF diff to be very much larger (i.e., several times larger) than HT_SIG_diff, which by definition will not contain any such effects. When the HT_LTF_diff is relatively large, as shown in FIG. 7, the extended channel estimation, or updating of the channel in block 63 is disabled, and the basic channel estimation (Eq. 4) is used to perform the estimation and subsequent equalization. Optionally, in mixed mode, the L_LTF fields are skipped because they can be susceptible to radio frequency (RF) transients that are still from the start of the packet. Thus, optionally, remodulating these fields is not necessary and skipped.

Figure 4:
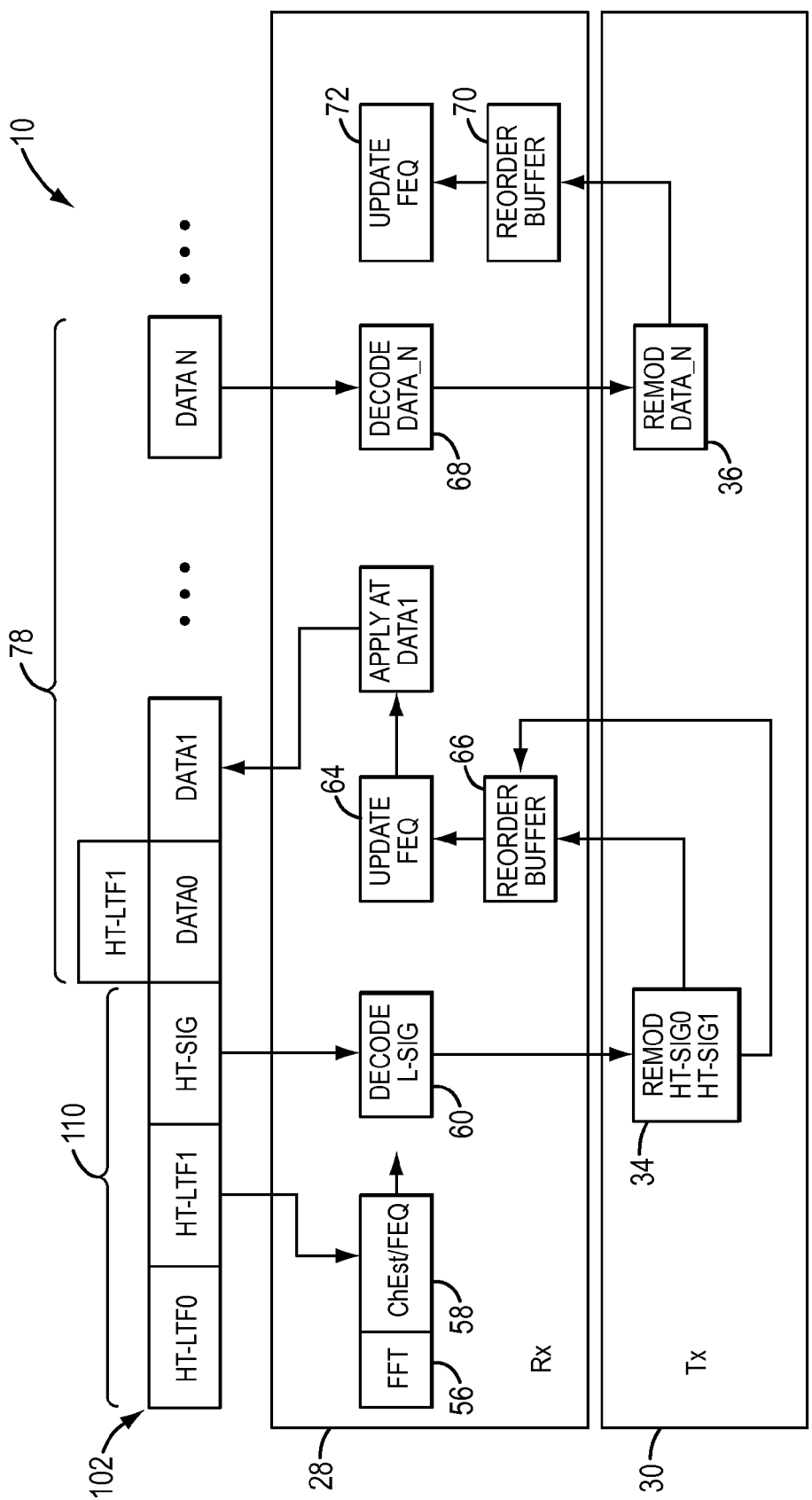
FIG. 4 shows a block diagram of the transceiver 10 when used in Greenfield mode, in accordance with an embodiment of the present invention.

FIG. 4 shows a block diagram of the transceiver 10 when used in Greenfield mode, in accordance with an embodiment of the present invention. A transmitted packet will have either a mixed mode structure or a Greenfield structure and the receiver 28 automatically detects which type of structure was transmitted and processes the packets accordingly. More specifically, this is possible with 802.11(n) devices because there is a 90-degree rotation in the phase of the HT-SIG field that is detectable by the receiver 28, as the preamble fields are modulated using bipolar phase shift keying (BPSK). In this regard, the packet is distinguishable. In mixed mode, as in Greenfield mode, the preamble fields are modulated using BPSK, but the 90-degree shift does not occur until after an unrotated L-SIG field, which makes the GF and MM packets uniquely distinguishable.

The structure of the 802.11(n) Greenfield mode packet is similar to the Mixed-mode, whereby information 102 is converted into packets, with the data partitioned into data symbols 78 and the data symbols are pre-pended with preamble fields 110. The fields 110 include a HT-LTF0, HT-LTF1 and HT-SIG fields with the HT-SIG field including an HT-SIG0 and HT-SIG1 fields. Due to the difference in the preambles between the Greenfield and mixed mode and the Greenfield preamble not having a L-SIG field, only the HT-SIG field is remodulated and used to update the FEQ coefficients when the transceiver 10 is in Greenfield mode. Upon receiving the remodulated HT-SIG from the transmitter (re-order buffer), the channel coefficients are then updated using three total data symbols, according to:

$$coef_k = \frac{\sum_{n=1}^{2}(HT-LTF_n + HT-SIG_n)}{4} \quad \text{EQ. (7)}$$

In this equation, the $HT\text{-}SIG_n$, n=1, 2, are the phase corrected FFT outputs of the HT SIGNAL fields, just as prescribed in Eq (3). In particular, the two stored HT-SIGNAL fields received, as stored output from the FFT 83 are phase corrected using the remodulated BPSK symbol 81. Similar to the mixed mode case, the HT-LTFn symbols are the FFT 56 outputs, phase corrected using the pre-stored BPSK training sequence.

In either mixed mode or Greenfield cases, optionally, data is remodulated and used to update the data FEQ (or the block 72). Using, for example the LMS (least mean squares) algorithm, or simple averaging of the stored, phase corrected FFT outputs. The same hardware (storage, remodulation path circuitry) can be used to implement such an option. This may have advantages because of the additional information that is available in the data portion of the packet.

FIG. 5 shows updating of the FEQ block, the decoder and demapper block weights after updating the channel estimation with the remodulated signal field, in an alternative embodiment of the present invention. The channel estimation block 58 is shown to provide coefficients to the block 64 and the pilot processing block 57, which processes the pilot signals. The block 64 provides updating information to the derive weights block 59 and the FEQ block 61, which performs the frequency equalization. The block 59 and the block 61 provide demapper updating information to the demapper block 65, which provides the demapping and provides the demapped information to the decoder blocks 60, 62 or 68.

Note, in the Figures, blocks 58, 60 and 68 all perform the same decoding function. Because these decoding operations can occur at different non-overlapping times, it is possible that the same physical decoder perform all the functions depicted by blocks 58, 60 and 68. Re-using the same decoder block is the preferred embodiment of the present invention because it allows a simpler, less expensive hardware design.

Figure 6:
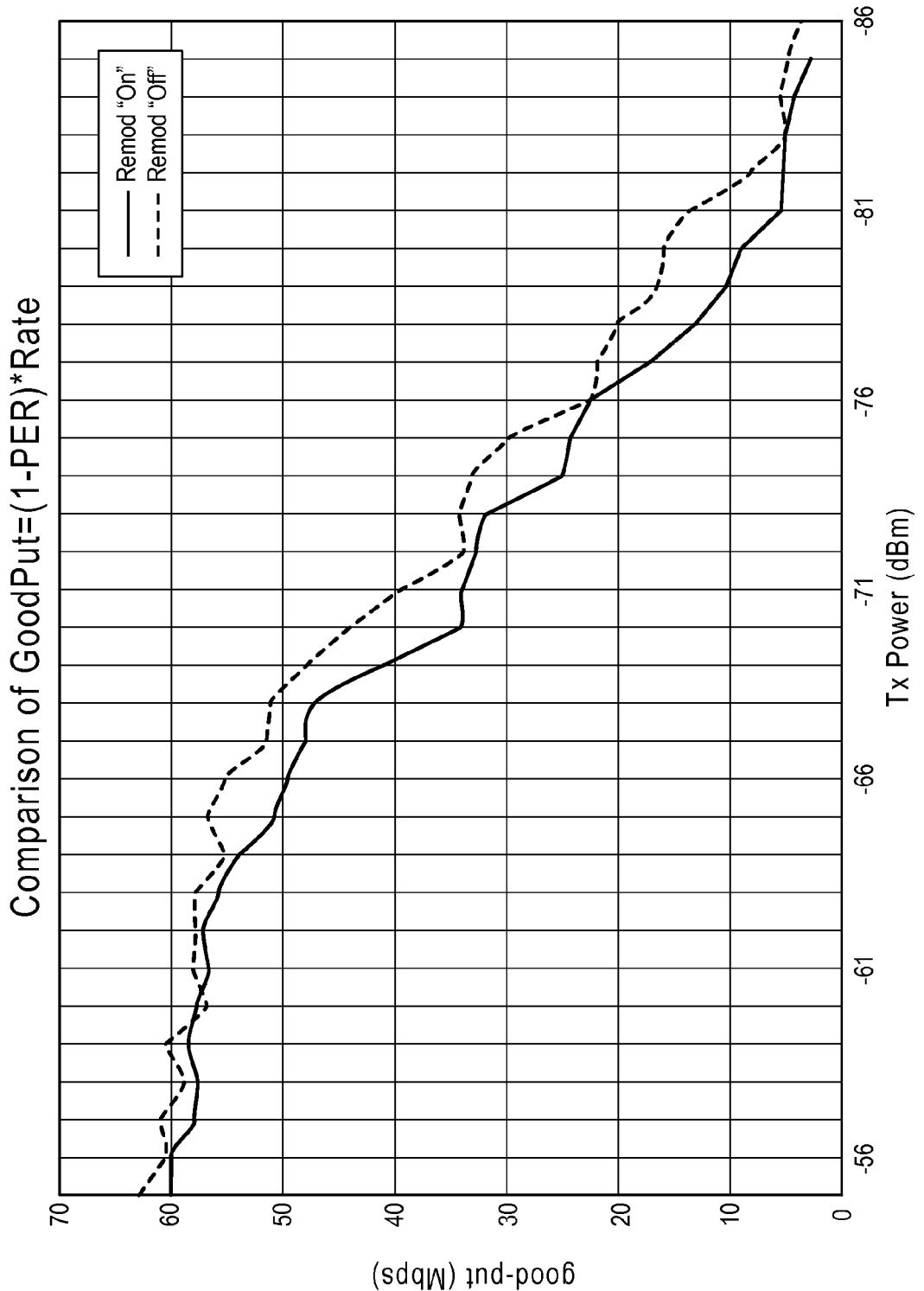
FIG. 6 shows a graph of the performance of the transceiver 100 in mixed mode and HT with remodulation turned on and off.

FIG. 6 shows a graph of the performance of the transceiver 100 in mixed mode and HT with remodulation turned on and off. The horizontal or x-axis represents the transmitter's power in a unit of dBm and the vertical or y-axis represents the throughput of the transceiver in million bits per second (Mbps). The dashed curve represents the performance of the transceiver 10 without remodulation and the solid curve represents the performance of the transceiver 10 with remodulation. This graph shows approximately 4.8 dB improvement in the mean square error (MSE) of the channel estimate ($H^{-1}$), which results in approximately between 2-3 dB improvement in sensitivity (the horizontal gap between the dashed and solid curves) and this translates to as much as a 50% increase in throughput (vertical gap distance between the dashed and solid curves).

Extension to Multistream Packets

In particular, reception is improved in a MIMO receiver by fully utilizing additional information present in the extended preambles that are part of 802.11n and other forms of wireless communications packets (802.16m, for example). The use of remodulated signal fields (L-SIG, and HT-SIG, where L=legacy and HT=high throughput), and legacy training fields (L-LTF) to improve the reception capability of HT packets is described above. The additional information was the remodulated signal fields, combined with the legacy training fields, which were used to improve the estimate of the channel and subsequent equalization process. The types of packet formats were both Greenfield (GF) and mixed mode (MM), but were limited to single spatial stream packets. This description covers the extension to multi-stream processing, using the same approach. As such, the FIGS. 1-7 apply to the extension described below. Finally, the extension to multi-stream processing is important because these formats allow the greatest throughput levels (essentially double) to be achieved by the latest wireless devices, such as 802.11n transceivers.

The extension to MM 2-stream packets is described hereinbelow, and how the multi-stream GF is a special case of the MM channel estimate enhancement is also described.

MM Multi-Stream Processing

Figure 8:
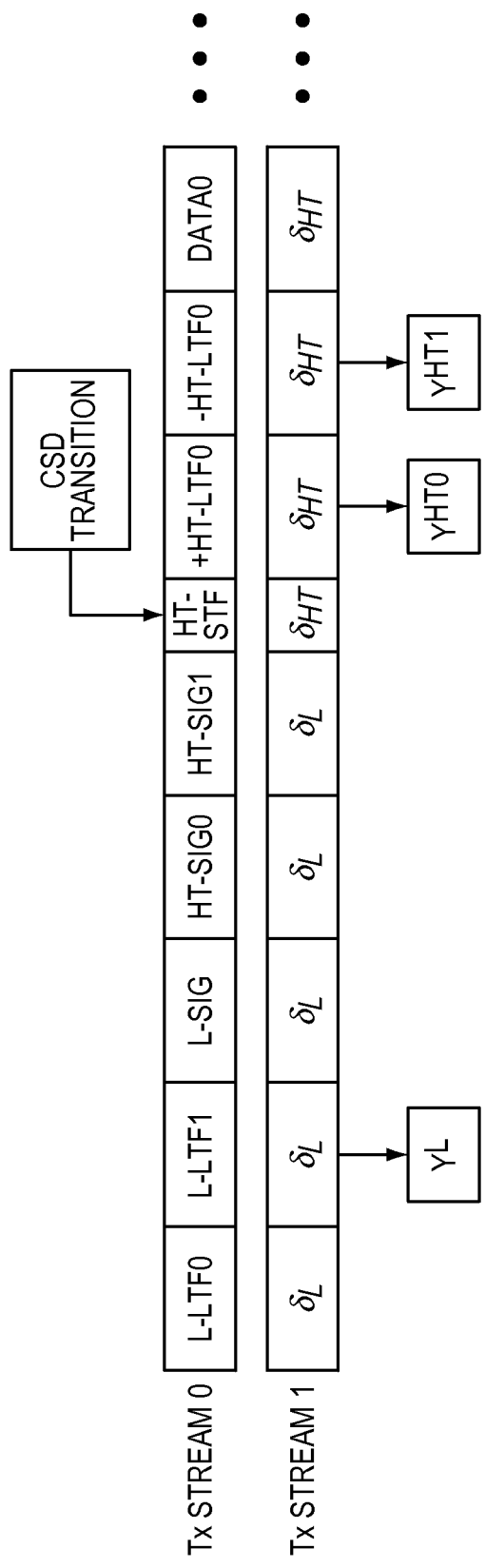
FIG. 8 illustrates a multi-stream packet format showing cyclic shift diversity (CSD) on the second stream.

When two-stream packets are transmitted, a technique known as "cyclic shift diversity" (CSD) will be applied to the second transmitted stream. The cyclic shift, or cyclic delay, is a time shift, either to delay or advance the second stream with respect to the first. The cyclic shift prevents unintended interference between the streams. The shifts defined in 802.11n, and shown in the FIG. 8 above, are 200 microseconds, applied during legacy portion of the packet (before the HT-STF, short training field), and 400 microseconds is applied to the second stream during the HT portion, after and including the HT-STF.

For MM-HT multi-stream packets, the processing is the same as that described in FIG. 2: decode the L-SIG (60), remodulate the L-SIG (32), detect the presence of the HT-SIG (46), decode (62) and remodulate the HT-SIG0 and HT-SIG1 (34), and finally, updating the FEQ (64) using the HT-LTF (48), and the remodulated signal fields.

When a multi-stream packet is present, the receiver will become aware of it during the HT-SIG decoding process (62). When the HT-SIG indicates that a two-stream packet is present, previous systems will disregard all the Legacy fields (signal and training), and use only the received HT-LTF fields to estimate the channel, and compute the estimator. Those frequency domain signals, $Y^{HT0}$ and $Y^{HT1}$ received during the $1^{st}$ and $2^{nd}$ HT-LTF training fields can be expressed as:

$$Y^{HT0} = (h_0 + \delta_{HT} h_1) X + n_0$$

$$Y^{HT1} = (-h_0 + \delta_{HT} h_1) X + n_1 \quad \text{EQ. (8)}$$

In this equation, $h_0$ and $h_1$ are the channels, X is the sent training symbol, n0, n1 are the measurement noise, and $\delta_L$ and $\delta_{HT}$ are the rotations corresponding to the cyclic shifts between the transmit streams. The latter are complex exponentials written as:

$$\delta_L = e^{j\tau_L n}$$

$$\delta_{HT} = e^{j\tau_{HT} n} \quad \text{EQ. (9)}$$

where $\tau$ are the time shift values mentioned above, and n is the OFDM subcarrier number. Note also that, the first transmitter negates the second HT-LTF, which accounts for the negative sign in the $Y^{HT1}$ measurement equation.

The two equations can be expressed in matrix form as:

$$Y^{HT} = \begin{bmatrix} 1 & \delta_{HT} \\ -1 & \delta_{HT} \end{bmatrix} \begin{bmatrix} h_0 \\ h_1 \end{bmatrix} X \quad \text{EQ. (10)}$$

A prior art receiver would lump the cyclic shift parameter into the channel coefficient vector, simplifying the measurement to:

$$Y^{HT} = \begin{bmatrix} 1 & 1 \\ -1 & 1 \end{bmatrix} \begin{bmatrix} h_0 \\ h_1 \end{bmatrix}^{HT} X \quad \text{EQ. (11)}$$

Where, above:

$$\begin{bmatrix} h_0 \\ h_1 \end{bmatrix}^{HT} = \begin{bmatrix} h_0 \\ \delta_{HT} h_1 \end{bmatrix} \quad \text{EQ. (12)}$$

A prior art estimate of the channel then is given as:

$$\begin{bmatrix} h_0 \\ h_1 \end{bmatrix}_{HT} = \frac{1}{2} \begin{bmatrix} +1 & -1 \\ +1 & +1 \end{bmatrix} Y^{HT} \quad \text{EQ. (13)}$$

Note that the prior art estimate does not include any legacy fields. We can improve on the estimate in this invention by including the legacy fields, but to do so we must take into account the cyclic shift difference between the legacy and HT fields, shown in FIG. 8, through the use of a multi-dimensional joint estimate measurement equation. Using the legacy fields, the multi-dimensional joint estimate measurement equation can be written as:

$$\begin{bmatrix} Y^L \\ H^{HT0} \\ Y^{HT1} \end{bmatrix} = \begin{bmatrix} +1 & \delta_L \delta_{HT}^* \\ +1 & 1 \\ -1 & 1 \end{bmatrix} \begin{bmatrix} h_0 \\ h_1 \end{bmatrix}_{HT} + N \quad \text{EQ. (14)}$$

Here, the legacy measurements are combined into the vector $Y^L$, which can be an average of all the previous legacy fields. There are 5 total fields that can be used, so the average is:

$$Y^L = \frac{1}{5}(Y^{L0} + Y^{L1} + Y^{LSIG} + Y^{HTSIG0} + Y^{HTSIG1}) \quad \text{EQ. (15)}$$

Averaging will improve the estimate because it will reduce the noise variance on $Y^L$ by a factor of square-root of 5 (~2.31). The improved HT channel estimate then becomes:

$$\begin{bmatrix} h_0 \\ h_1 \end{bmatrix}_{HT} = (D^*D)^{-1} D^* \begin{bmatrix} Y^L \\ Y^{HT0} \\ Y^{HT1} \end{bmatrix} \quad \text{EQ. (16)}$$

Where $$D = \begin{bmatrix} +1 & \delta_L \delta_{HT}^* \\ +1 & 1 \\ -1 & 1 \end{bmatrix} \quad \text{EQ. (17)}$$

And $$(D^*D)^{-1} = \frac{1}{8} \begin{bmatrix} 3 & -\delta_L \delta_{HT}^* \\ -\delta_L^* \delta_{HT} & 3 \end{bmatrix} \quad \text{EQ. (18)}$$

From these terms, the error covariance of the improved estimate can be calculated, and compared to the prior art estimator. For the prior art estimator, the error variance can be shown to be:

$$E_{pa} = \text{trace}\left(\frac{1}{2}\begin{bmatrix} 1 & -1 \\ 1 & 1 \end{bmatrix}\right) = 1 \quad \text{EQ. (19)}$$

Since it is equal to 1, that means that the error variance will be equal to the variance of the received symbols, ie, no estimation gain.

Similarly, the new estimator variance can be shown to be:

$$E_{new} = \text{trace}(D^*D)^{-1} \quad \text{EQ. (20)}$$
$$= \text{trace}\left(\frac{1}{8}\begin{bmatrix} 3 & -\delta_L\delta_{HT}^* \\ -\delta_L^*\delta_{HT} & 3 \end{bmatrix}\right)$$
$$= \frac{3}{4}$$

Compared to the conventional estimate, the reduced variance (3/4) will result in a 1.25 dB improvement in estimate variation. An alternate scheme can further improve on this performance.

Expected MSE Reduction with Redesigned Mixed Mode Estimator

If the entire legacy portion of the preamble is used into one tall vector $Y^L$, the row estimate for the mixed mode case has the form:

$$\begin{bmatrix} h_0 \\ h_1 \end{bmatrix}_{HT} = (D^*D)^{-1}D^*\begin{bmatrix} [Y^L] \\ Y^{HT0} \\ Y^{HT1} \end{bmatrix} \quad \text{EQ. (21)}$$

$$D = \begin{bmatrix} +1_5 & \delta_L\delta_{HT}^* 1_5 \\ +1 & 1 \\ -1 & 1 \end{bmatrix}$$

In the estimate, $1_5$ is a vector of ones, and the legacy measurement vector is:

$$[Y^L] = \begin{bmatrix} Y^{L0} \\ Y^{L1} \\ Y^{LSIG} \\ Y^{HTSIG0} \\ Y^{HTSIG1} \end{bmatrix} \quad \text{EQ. (22)}$$

In this case, the estimator is:

$$M^{-1} = (D^*D)^{-1}D^*, \quad \text{EQ. (23)}$$

where $$(D^*D)^{-1} = \frac{1}{24}\begin{bmatrix} 7 & -5\delta_L\delta_{HT}^* \\ -5\delta_L^*\delta_{HT} & 7 \end{bmatrix}. \quad \text{EQ. (24)}$$

The MSE of the row estimate is then:

$$Tr(M^{-1}M^{-*}) = Tr(D^*D)^{-1}D^*((D^*D)^{-1}D^*)^* \quad \text{EQ. (25)}$$
$$= Tr(D^*D)^{-*}$$
$$= \frac{14}{24}.$$

This provides an MSE reduction of 2.34 dB on each row of the channel matrix estimate, as compared to the original LTF-only estimate.

Expected MSE Reduction with Redesigned Green Field Mode Estimator

Currently, two HT-LTF0 fields are used, in addition to the HT-LTF1 to estimate the channel. Thus, GF is already better than the LTF only MM estimation. We can quantify this, by writing the estimate as $$\begin{bmatrix} h_0 \\ h_1 \end{bmatrix}_{HT} = (D^*D)^{-1}D^*\begin{bmatrix} Y^{HT0} \\ Y^{HT0} \\ Y^{HT1} \end{bmatrix} \quad \text{EQ. (26)}$$

$$D = \begin{bmatrix} +1 & +1 \\ +1 & +1 \\ -1 & +1 \end{bmatrix}$$

Following the same analysis from above, $$(D^*D)^{-1} = \frac{1}{8}\begin{bmatrix} 3 & -1 \\ -1 & 3 \end{bmatrix} \quad \text{EQ. (27)}$$

So, the GF has a MSE on the row estimates of the channel $$MSE = Tr(D^*D)^{-*} = \frac{3}{4}. \quad \text{EQ. (28)}$$

This means that, compared to the MM LTF-only estimate, the GF should have about 1.25 dB better MSE.

GF Estimation Using Remodulated Signal Fields

Again, using the entire legacy portion of the preamble into one tall vector $Y^L$, the row estimate for the green field mode case has the form:

$$\begin{bmatrix} h_0 \\ h_1 \end{bmatrix}_{HT} = (D^*D)^{-1}D^*\begin{bmatrix} [Y^L] \\ Y^{HT0} \\ Y^{HT0} \\ Y^{HT1} \end{bmatrix} \quad \text{EQ. (29)}$$

$$D = \begin{bmatrix} +1_2 & +1_2 \\ +1 & +1 \\ +1 & +1 \\ -1 & +1 \end{bmatrix}$$

In the estimate, $1_2$ is a vector of ones, and the legacy measurement vector contains only the HTSIG fields:

$$[Y^L] = \begin{bmatrix} Y^{HTSIG0} \\ Y^{HTSIG1} \end{bmatrix} \quad \text{EQ. (30)}$$

Again, the estimator is:

$$M^{-1} = (D^*D)^{-1}D^*,\qquad \text{EQ. (31)}$$

where now:

$$(D^*D)^{-1} = \frac{1}{16}\begin{bmatrix} 5 & -3 \\ -3 & 5 \end{bmatrix} \qquad \text{EQ. (32)}$$

The MSE of the row estimate is then:

$$MSE = Tr(D^*D)^{-*} = \frac{10}{16}. \qquad \text{EQ. (33)}$$

This results in a MSE reduction of 2.04 dB on the estimate of each row of the channel matrix.

TABLE 1

Summary of Estimation MSE Improvements (2 Stream Case)

|  |  | MSE | Improvement (dB) |
|---|---|---|---|
| Mixed Mode | No remodulation | 1 | 0 |
| Mixed Mode | With remodulation | 14/24 | 2.34 |
| Greenfield | No remodulation | 3/4 | 1.25 |
| Greenfield | With remodulation | 10/16 | 2.04 |

Extension to 3 Stream Processing

The current processing for channel estimation for 3-stream channels, as specified in the IEEE 802.11n standard, utilizes 4 HT-LTF fields to estimate 3 coefficients per row of the channel matrix. Each receiver chain estimates one row of the matrix.

The row "measurement" can be written as:

$$Y^{HT} = \begin{bmatrix} Y_0 \\ Y_1 \\ Y_2 \\ Y_3 \end{bmatrix} = \begin{bmatrix} +1 & +1 & +1 \\ -1 & +1 & +1 \\ +1 & -1 & +1 \\ +1 & +1 & -1 \end{bmatrix}\begin{bmatrix} h_0 \\ h_1 \\ h_2 \end{bmatrix}_{HT} + N \qquad \text{EQ. (34)}$$

If, $$D = \begin{bmatrix} +1 & +1 & +1 \\ -1 & +1 & +1 \\ +1 & -1 & +1 \\ +1 & +1 & -1 \end{bmatrix} \qquad \text{EQ. (35)}$$

then the row variance estimate can be obtained as above, with $$(D^*D)^{-1} = \frac{1}{4}\begin{bmatrix} 1 & 0 & 0 \\ 0 & 1 & 0 \\ 0 & 0 & 1 \end{bmatrix} \qquad \text{EQ. (36)}$$

Then MSE of the channel row estimate is $$MSE = Tr(D^*D)^{-*} = \frac{3}{4}. \qquad \text{EQ. (37)}$$

Mixed Mode Case with Extended Estimation Using Remodulated Signal Fields

If we only remodulate the SIGNAL fields and the legacy LTFs, the estimation problem can be expressed as:

$$\begin{bmatrix} h_0 \\ h_1 \\ h_2 \end{bmatrix}_{HT} = (D^*D)^{-1}D^* \begin{bmatrix} [Y^L] \\ Y^{HT0} \\ Y^{HT1} \\ Y^{HT2} \\ Y^{HT3} \end{bmatrix} \qquad \text{EQ. (38)}$$

$$D = \begin{bmatrix} +1_5 & \delta_{L1}\delta_{H1}^*1_5 & \delta_{L2}\delta_{H2}^*1_5 \\ +1 & +1 & +1 \\ -1 & +1 & +1 \\ +1 & -1 & +1 \\ +1 & +1 & -1 \end{bmatrix}$$

Here there are 7 elements to average, as opposed to the standard 4 HT-LTF's, to estimate the 3 channel coefficients. The inverse portion of the estimator has the closed-form solution:

$$(D^*D)^{-1} = \frac{1}{76}\begin{bmatrix} 14 & -5\partial_1 & -5\partial_2 \\ -5\partial_1^* & 14 & -5\partial_1^*\partial_2 \\ -5\partial_1^* & -5\partial_1\partial_2^* & 14 \end{bmatrix} \qquad \text{EQ. (39)}$$

Above, the variable $\partial_1 = \delta_{L1}\delta_{H1}^*$ is used to simplify notation. So, here the improvement in MSE is given as:

$$MSE = Tr(D^*D)^{-*} \qquad \text{EQ. (40)}$$
$$= \frac{21}{38}.$$

Compared to the standard estimation using only HT-LTFs, the improvement is $$10\log_{10}\left(\frac{21/38}{3/4}\right) = 1.326 \text{ dB}. \qquad \text{EQ. (41)}$$

MM Using Only L-SIGNAL and HT-SIGNAL Fields for Remodulation

For a simpler estimate, avoiding L-LTF fields, which may be corrupted by RF transients, or GI errors, the estimation equation can be written $$\begin{bmatrix} h_0 \\ h_1 \\ h_2 \end{bmatrix}_{HT} = (D^*D)^{-1}D^* \begin{bmatrix} [Y^L] \\ Y^{HT0} \\ Y^{HT1} \\ Y^{HT2} \\ Y^{HT3} \end{bmatrix} \quad \text{EQ. (42)}$$

$$D = \begin{bmatrix} +1_3 & \delta_{L1}\delta_{H1}^*1_3 & \delta_{L2}\delta_{H2}^*1_3 \\ +1 & +1 & +1 \\ -1 & +1 & +1 \\ +1 & -1 & +1 \\ +1 & +1 & -1 \end{bmatrix}$$

Note the portion of the estimate for the legacy shifted signal fields now has dimension 3. Now the inverse portion has the closed form:

$$(D^*D)^{-1} = \frac{1}{52}\begin{bmatrix} 10 & -3\partial_1 & -3\partial_2 \\ -3\partial_1^* & 10 & -3\partial_1^*\partial_2 \\ -3\partial_2^* & -3\partial_1\partial_2^* & 10 \end{bmatrix} \quad \text{EQ. (43)}$$

Again, computing the MSE from the trace function formula $$MSE = Tr(D^*D)^{-*} \quad \text{EQ. (44)}$$

$$= \frac{15}{26}.$$

Comparing to the standard, non-remodulated estimate, the improvement for this mixed-mode case is:

$$10\log_{10}\left(\frac{15/26}{3/4}\right) = 1.139 \text{ dB}. \quad \text{EQ. (45)}$$

Greenfield Estimation Using Remodulation, Using Only SIGNAL Fields

For the Greenfield case, the estimation simplifies because there is no CSD transition between preamble and HT data portions of the packet.

$$\begin{bmatrix} h_0 \\ h_1 \\ h_2 \end{bmatrix}_{HT} = (D^*D)^{-1}D^* \begin{bmatrix} [Y^L] \\ Y^{HT0} \\ Y^{HT1} \\ Y^{HT2} \\ Y^{HT3} \end{bmatrix} \quad \text{EQ. (46)}$$

$$D = \begin{bmatrix} +1_2 & +1_2 & +1_2 \\ +1 & +1 & +1 \\ -1 & +1 & +1 \\ +1 & -1 & +1 \\ +1 & +1 & -1 \end{bmatrix}$$

Following the same analysis, the estimator has the closed form solution:

$$(D^*D)^{-1} = \frac{1}{20}\begin{bmatrix} 4 & -1 & -1 \\ -1 & 4 & -1 \\ -1 & -1 & 4 \end{bmatrix} \quad \text{EQ. (47)}$$

Then, the MSE is computed as $$MSE = Tr(D^*D)^{-*} \quad \text{EQ. (48)}$$

$$= \frac{12}{20}.$$

Similarly, the improvement compared to straight HT-LTF estimation is computed as $$10\log_{10}\left(\frac{21/20}{3/4}\right) = 0.97 \text{ dB}. \quad \text{EQ. (49)}$$

Note, that for GF packets, there are actually 2 HT-LTF0 fields. We assume that these are averaged together prior to the remodulation and estimation. If we do not pre-average the HT-LTF0 fields, but keep them separate in the estimate, the D matrix adds a row, by repeating the second row, and the form of the estimator is identical to the 7-row MM estimator above, without the phase shift corrections:

$$(D^*D)^{-1} = \frac{1}{52}\begin{bmatrix} 10 & -3 & -3 \\ -3 & 10 & -3 \\ -3 & -3 & 10 \end{bmatrix} \quad \text{EQ. (50)}$$

In this case, the MSE improves by 1.139 dB, just as before.

TABLE 2

MSE Improvements for 3-Stream Processing

| | | MSE | Improvement (dB) |
|---|---|---|---|
| Mixed Mode | No remodulation | 3/4 | 0 |
| Mixed Mode | Remodulation with L-LTF | 21/38 | 1.33 |
| Mixed | With remodulation Mode, no L-LTF | 15/26 | 1.14 |
| Greenfield | No remodulation | 3/4 | 0 |
| Greenfield | With remodulation of HT-SIG0,1 | 12/20 | 0.97 |

Summary

Compared to the current MM estimation, the channel estimate can be improved by up to about 2.3 dB in MSE. The current improvement in GF estimation MSE is up to 0.97 dB.

Note: However, the GF improvement should also provide robustness to carrier impairments, because the additional HTSIG fields are later in the preamble portion of the packet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A transceiver for use in a multi-input-multi-output (MIMO) Orthogonal Frequency Domain Multiplexing (OFDM) wireless communication system, the transceiver operative to transmit and receive information in the form of fields, the fields including signal fields, the transceiver comprising:
a first decoder block of a MIMO OFDM wireless communication system responsive to a first signal field of a preamble of a packet transmitted in a communication channel, the first signal field having been modulated prior to being received by the first decoder, the first decoder block configured to decode the first signal field and operative to generate a first decoded preamble field;
a second decoder block of a MIMO OFDM wireless communication system responsive to a second signal field of a preamble of a packet transmitted in a communication channel, the second signal field having been modulated prior to being received by the second decoder, wherein the second decoder block makes a determination as to whether the packet is a single stream packet or a multistream packet; the second decoder block configured to decode the second signal field and operative to generate a second decoded preamble field;
a first remodulator of a MIMO OFDM wireless communication system responsive to the first decoded preamble field and operative to generate first remodulated encoded preamble field; when the packet is a multistream packet then the remodulated signal fields are subsequently used to improve a multidimensional channel estimate; and
a frequency equalizer update block operative to update coefficients of a frequency equalizer (FEQ) using the first remodulated encoded preamble bits, the FEQ update block causing the FEQ to generate equalized data field output, which are applied to at least one data field, wherein a cyclic shift difference (CSD) between a legacy portion and a high-throughput (HT) portion of the multistream packet is utilized in the estimate.

2. The transceiver as recited in claim 1, wherein the second signal field comprises two signal field symbols.

3. The transceiver, as recited in claim 2, wherein the two signal field symbols are decoded by the second decoder block and are remodulated to provide an improved estimate for use by the FEQ update block to further update the coefficients of the FEQ and to apply the same to the at least one data field.

4. The transceiver, as recited in claim 1, wherein the first signal field comprises a legacy signal field and the second signal field comprises a high-throughput (HT) signal field.

5. The transceiver, as recited in claim 1, wherein the packet comprises a Greenfield packet.

6. The transceiver, as recited in claim 1, wherein the multidimensional joint estimate is provided by the equation:

$$\begin{bmatrix} h_0 \\ h_1 \end{bmatrix}_{HT} = (D^*D)^{-1}D^* \begin{bmatrix} Y^L \\ Y^{HT0} \\ Y^{HT1} \end{bmatrix}$$

$$D = \begin{bmatrix} +1 & \delta_L \delta_{HT}^* \\ +1 & 1 \\ -1 & 1 \end{bmatrix}$$

where $Y^L$ is the legacy frequency domain signal, $Y^{HT0}$ and $Y^{HT1}$ are high throughput frequency domain signal, $h_o$ and $h_1$ are the channels, $\delta_L$ and $\delta_{HT}$ are the rotations corresponding to cyclic shifts between the multistreams.

7. The transceiver, as recited in claim 1, wherein the transceiver transmits and receives information in accordance with the IEEE 802.11(n) standard.

8. The transceiver, as recited in claim 1, wherein the coefficients are updated in accordance with the least means square (LMS) algorithm.

9. The transceiver, as recited in claim 1, wherein the coefficients are updated in accordance with the Recursive Least-squares (RLS) algorithm.

10. The transceiver, as recited in claim 1, wherein the equalized preamble field output is applied to more than one data field.

11. The transceiver, as recited in claim 1, further including a data decoder block of a MIMO OFDM wireless communication system responsive to the at least one data field and operative to generate decoded data field.

12. The transceiver, as recited in claim 11, further including a data remodulator of a MIMO OFDM wireless communication system responsive to the decoded data field and operative to generate remodulated encoded data field and a data frequency equalizer update block operative to update coefficients of a data frequency equalizer (FEQ) using the remodulated encoded data field, the data FEQ update block causing the data FEQ to generate equalized data field output, which are applied to at least one data field.

13. The transceiver, as recited in claim 12, wherein said second decoder block is responsive to the second and third signal fields and is operative to generate an error field that is compared against a threshold and based on the error being larger or smaller than the threshold, the update block is enabled or disabled.

14. A method of enhancing channel estimation in a multi-input-multi-output (MIMO) Orthogonal Frequency Domain Multiplexing (OFDM) wireless communication system wherein information is transmitted and received in the form of fields, the fields including signal fields, the method comprising:
first decoding, in a MIMO OFDM wireless communication system, a first signal field of a preamble of a packet transmitted in a communication channel, the first signal field having been previously modulated, a generating a first decoded preamble field;
a second decoding, in MIMO OFDM wireless communication system, a second signal field of a preamble of a packet transmitted in a communication channel, wherein the second decoding makes a determination as to whether the packet is a single stream packet or a multistream packet the second signal field having been previously modulated and generating a second decoded preamble field; and
a first remodulating, in a MIMO OFDM wireless communication system, when the packet is a multistream packet then the remodulated signal fields are subsequently used to improve a multidimensional channel estimate; the decoded preamble field and to generating first remodulated encoded preamble bits; updating coefficients of a frequency equalizer (FEQ) using the first remodulated encoded preamble field and causing the FEQ to generate equalized data field output, which are applied to at least one data field, wherein a cyclic shift difference (CSD) between a legacy portion and a high-throughput (HT) portion of the multistream packet is utilized in the estimate.

15. The method of claim 14, wherein the first signal field comprises a legacy signal field and the second signal field comprises a high-throughput (HT) signal field.

16. The method of claim 14, wherein the packet comprises a Greenfield packet.

17. The method of claim 14, wherein the two-dimensional joint estimate is provided by the equation:

$$\begin{bmatrix} h_0 \\ h_1 \end{bmatrix}_{HT} = (D^*D)^{-1}D^* \begin{bmatrix} Y^L \\ Y^{HT0} \\ Y^{HT1} \end{bmatrix}$$

$$D = \begin{bmatrix} +1 & \delta_L\delta_{HT}^* \\ +1 & 1 \\ -1 & 1 \end{bmatrix}$$

where $Y^L$ is the legacy frequency domain signal, $Y^{HT0}$ and $Y^{HT1}$ are high throughput frequency domain signal, $h_o$ and $h_1$ are the channels, $\delta_L$ and $\delta_{HT}$ are the rotations corresponding to cyclic shifts between the multistreams.

18. A transceiver for use in a multi-input-multi-output (MIMO) Orthogonal Frequency Domain Multiplexing (OFDM) wireless communication system, the transceiver operative to transmit and receive information in the form of fields, the fields including signal fields, the transceiver comprising:

a first decoder block of a MIMO OFDM wireless communication system responsive to a first signal field of a preamble of a packet transmitted in a communication channel, the first signal field having been modulated prior to being received by the first decoder, the first decoder block configured to decode the first signal field and operative to generate a first decoded preamble field;

a second decoder block of a MIMO OFDM wireless communication system responsive to a second signal field of a preamble of a packet transmitted in a communication channel, the second signal field having been modulated prior to being received by the second decoder, wherein the second decoder block makes a determination as to whether the packet is a single stream packet or a multistream packet; the second decoder block configured to decode the second signal field and operative to generate a second decoded preamble field;

a first remodulator of a MIMO OFDM wireless communication system responsive to the first decoded preamble field and operative to generate first remodulated encoded preamble field; when the packet is a multistream packet then the remodulated signal fields are subsequently used to improve a multidimensional channel estimate;

a frequency equalizer update block operative to update coefficients of a frequency equalizer (FEQ) using the first remodulated encoded preamble bits, the FEQ update block causing the FEQ to generate equalized data field output, which are applied to at least one data field, wherein a cyclic shift difference (CSD) between a legacy portion and a high-throughput (HT) portion of the multistream packet is utilized in the estimate;

a data decoder block of a MIMO OFDM wireless communication system responsive to the at least one data field and operative to generate decoded data field;

a data remodulator of a MIMO OFDM wireless communication system responsive to the decoded data field and operative to generate remodulated encoded data field;

a data frequency equalizer update block operative to update coefficients of a data frequency equalizer (FEQ) using the remodulated encoded data field, the data FEQ update block causing the data FEQ to generate equalized data field output, which are applied to at least one data field, wherein said second decoder block is responsive to the second and third signal fields and is operative to generate an error field that is compared against a threshold and based on the error being larger or smaller than the threshold, the update block is enabled or disabled.

19. A method of enhancing channel estimation in a multi-input-multi-output (MIMO) Orthogonal Frequency Domain Multiplexing (OFDM) wireless communication system, wherein information is transmitted and received in the form of fields, the fields including signal fields, the method comprising:

first decoding, in a MIMO OFDM wireless communication system, a first signal field of a preamble of a packet transmitted in a communication channel, the first signal field having been previously modulated, a generating a first decoded preamble field;

a second decoding, in a MIMO OFDM wireless communication system, a second signal field of a preamble of a packet transmitted in a communication channel, wherein the second decoding makes a determination as to whether the packet is a single stream packet or a multistream packet the second signal field having been previously modulated and generating a second decoded preamble field; and a first remodulating, in a MIMO OFDM wireless communication system, when the packet is a multistream packet then the remodulated signal fields are subsequently used to improve a multidimensional channel estimate; the decoded preamble field and to generating first remodulated encoded preamble bits; updating coefficients of a frequency equalizer (FEQ) using the first remodulated encoded preamble field and causing the FEQ to generate equalized data field output, which are applied to at least one data field, wherein a cyclic shift difference (CSD) between a legacy portion and a high-throughput (HT) portion of the multistream packet is utilized in the estimate, data decoding in a MIMO OFDM wireless communication system responsive to the at least one data field and operative to generate decoded data field, a data remodulating in a MIMO OFDM wireless communication system responsive to the decoded data field and operative to generate remodulated encoded data field; and a data frequency equalizer updating operative to update coefficients of a data frequency equalizer (FEQ) using the remodulated encoded data field, the data FEQ updating causing the data FEQ to generate equalized data field output, which are applied to at least one data field, wherein said second decoding is responsive to the second and third signal fields and is operative to generate an error field that is compared against a threshold and based on the error being larger or smaller than the threshold, the updating is enabled or disabled.

20. A transceiver for use in a multi-input-multi-output (MIMO) Orthogonal Frequency Domain Multiplexing (OFDM) wireless communication system, the transceiver operative to transmit and receive information in the form of fields, the fields including signal fields, the transceiver comprising:

a first decoder block of a MIMO OFDM wireless communication system responsive to a first signal field of a preamble of a packet transmitted in a communication channel, the first signal field having been modulated prior to being received by the first decoder, the first decoder block configured to decode the first signal field and operative to generate a first decoded preamble field;

a second decoder block of a MIMO OFDM wireless communication system responsive to a second signal field of a preamble of a packet transmitted in a communication channel, the second signal field having been modulated prior to being received by the second decoder, wherein the second decoder block makes a determination as to whether the packet is a single stream packet or a multi-stream packet; the second decoder block configured to decode the second signal field and operative to generate a second decoded preamble field;

a first remodulator of a MIMO OFDM wireless communication system responsive to the first decoded preamble field and operative to generate first remodulated encoded preamble field; when the packet is a multistream packet then the remodulated signal fields are subsequently used to improve a multidimensional channel estimate; and a frequency equalizer update block operative to update coefficients of a frequency equalizer (FEQ) using the first remodulated encoded preamble bits, the FEQ equalizer update block causing the FEQ to generate equalized data field output, which are applied to at least one data field, wherein the multi-dimensional channel estimate is provided by the equation:

$$\begin{bmatrix} h_0 \\ h_1 \end{bmatrix}_{HT} = (D^*D)^{-1}D^* \begin{bmatrix} Y^L \\ Y^{HT0} \\ Y^{HT1} \end{bmatrix} \quad D = \begin{bmatrix} +1 & \delta_L\delta_{HT}^* \\ +1 & 1 \\ -1 & 1 \end{bmatrix}$$

where $Y^L$ is the legacy frequency domain signal, $Y^{HT0}$ and $Y^{HT1}$ are high throughput frequency domain signal, $h_o$ and $h_1$ are the channels, $\delta_L$ and $\delta_{HT}$ are the rotations corresponding to cyclic shifts between the multistreams.

21. A method of enhancing channel estimation in a multi-input-multi-output (MIMO) Orthogonal Frequency Domain Multiplexing (OFDM) wireless communication system wherein information is transmitted and received in the form of fields, the fields including signal fields, the method comprising:

first decoding, in a MIMO OFDM wireless communication system, a first signal field of a preamble of a packet transmitted in a communication channel, the first signal field having been previously modulated, a generating a first decoded preamble field;

a second decoding, in MIMO OFDM wireless communication system, a second signal field of a preamble of a packet transmitted in a communication channel, wherein the second decoding makes a determination as to whether the packet is a single stream packet or a multistream packet the second signal field having been previously modulated and generating a second decoded preamble field; and a first remodulating, in a MIMO OFDM wireless communication system, when the packet is a multistream packet then the remodulated signal fields are subsequently used to improve a multidimensional channel estimate; the decoded preamble field and to generating first remodulated encoded preamble bits; updating coefficients of a frequency equalizer (FEQ) using the first remodulated encoded preamble field and causing the FEQ to generate equalized data field output, which are applied to at least one data field, wherein a cyclic shift difference (CSD) between a legacy portion and a high-throughput (HT) portion of the multistream packet is utilized in the estimate, wherein the two-dimensional channel estimate is provided by the equation:

$$D = \begin{bmatrix} +1 & \delta_L\delta_{HT}^* \\ +1 & 1 \\ -1 & 1 \end{bmatrix} \quad \begin{bmatrix} h_0 \\ h_1 \end{bmatrix}_{HT} = (D^*D)^{-1}D^* \begin{bmatrix} Y^L \\ Y^{HT0} \\ Y^{HT1} \end{bmatrix}$$

where $Y^L$ is the legacy frequency domain signal, $Y^{HT0}$ and $Y^{HT1}$ are high throughput frequency domain signal, $h_o$ and $h_1$ are the channels, $\delta_L$ and $\delta_{HT}$ are the rotations corresponding to cyclic shifts between the multistreams.

\* \* \* \* \*